United States Patent
Glahn et al.

(10) Patent No.: US 6,968,701 B2
(45) Date of Patent: Nov. 29, 2005

(54) ENGINE INTEGRATED AUXILIARY POWER UNIT

(75) Inventors: J. Axel Glahn, Manchester, CT (US); Michael K. Sahm, Avon, CT (US)

(73) Assignee: United Technologies Corporation, Hartford, CT (US)

( * ) Notice: Subject to any disclaimer, the term of this patent is extended or adjusted under 35 U.S.C. 154(b) by 18 days.

(21) Appl. No.: 10/327,256

(22) Filed: Dec. 20, 2002

(65) Prior Publication Data

US 2003/0150206 A1 Aug. 14, 2003

Related U.S. Application Data

(60) Provisional application No. 60/348,889, filed on Jan. 16, 2002.

(51) Int. Cl.[7] .............................. F02C 3/10; F02C 6/00
(52) U.S. Cl. ........................... 60/792; 60/226.1; 60/262
(58) Field of Search ................. 60/226.1, 262, 60/263, 268, 269, 785, 792, 758, 789, 39.15, 791

(56) References Cited

U.S. PATENT DOCUMENTS

| | | | | |
|---|---|---|---|---|
| 3,167,911 A | * | 2/1965 | Sandre | ..................... 60/229 |
| 4,054,030 A | * | 10/1977 | Pedersen | ..................... 60/262 |
| 4,068,471 A | * | 1/1978 | Simmons | ..................... 60/262 |
| 4,958,489 A | * | 9/1990 | Simmons | ................... 60/226.3 |
| 5,136,837 A | | 8/1992 | Davison | |
| 5,435,127 A | * | 7/1995 | Luffy et al. | ................... 60/204 |
| 5,485,717 A | | 1/1996 | Williams | |
| 5,775,092 A | * | 7/1998 | Hines | ......................... 60/791 |
| 6,672,049 B2 | * | 1/2004 | Franchet et al. | ........... 60/226.1 |
| 2004/0006994 A1 | * | 1/2004 | Walsh et al. | ................... 60/792 |

FOREIGN PATENT DOCUMENTS

| | | |
|---|---|---|
| EP | 0 459 816 A1 | 12/1991 |
| FR | 1.075.384 | 10/1954 |
| GB | 2 038 421 A | 12/1978 |
| JP | 01208526 | 8/1989 |

* cited by examiner

Primary Examiner—Cheryl Tyler
Assistant Examiner—William H. Rodriguez
(74) Attorney, Agent, or Firm—Bachman & LaPointe, PC

(57) ABSTRACT

The present invention relates to an engine integrated auxiliary power unit. The engine comprises a high pressure spool which includes a high pressure compressor connected to a high pressure turbine and a low pressure spool which includes a low pressure compressor connected to a low pressure turbine. The engine further has a system for independently operating the high pressure spool and thus allowing the high pressure spool to function as an auxiliary power unit.

10 Claims, 2 Drawing Sheets

ENGINE INTEGRATED AUXILIARY POWER UNIT

CROSS REFERENCE TO RELATED APPLICATION(S)

The present application claims the benefit of U.S. Provisional Patent Application Ser. No. 60/348,889, filed Jan. 16, 2002, to Glahn et al. entitled ENGINE INTEGRATED AUXILIARY POWER UNIT.

BACKGROUND OF THE INVENTION

The present invention relates to an engine integrated auxiliary power unit for use on an aircraft.

FIG. 1 shows a schematic of a modern, high-bypass, three-spool turbofan engine 10. Air enters the engine 10 through an inlet diffuser (not shown) and reaches the fan 12, which acts as a low pressure compressor and which is driven by a three-stage low turbine 14. Downstream of the fan 12, a part of the air is compressed fully and passed through the intermediate pressure compressor 16, which is driven by the intermediate turbine 18, and then through the high pressure compressor 20, which is driven by the high pressure turbine 22, into the combustion chamber 24. The remainder of the airflow bypasses the combustion chamber 24 to provide cold thrust. The bypass flow rejoins the remainder of the hot flow downstream of the turbine 14.

Typical two-spool arrangements combine the fan with the first intermediate compressor stages into the low pressure compression system, whereas the remaining stages are combined with the high pressure compressor. The turbine work split between the high pressure and low pressure systems is adjusted accordingly.

In either case, jet engine accessories like electrical power generators and pumps are driven via bevel gears, tower shafts, and external gearbox from the high pressure shaft. For engine start, the same arrangement is used to drive the high pressure spool from a starter, which expands pressurized air in a starter turbine. In order to be able to start the engine with such an arrangement, pressurized air needs to be provided and ducted to the engine. This is one of the major tasks for the auxiliary power unit, a small gas turbine that is usually located in the tail-cone of an aircraft. Additional functions of the auxiliary power unit include generation of electrical and shaft power while the main engines are not running, e.g. at the gate, as well as providing air for the aircraft's environmental control system.

From an aircraft system point of view, potential weight and cost savings are seen in a co-location of auxiliary power unit and main engines. Such an engine mounted auxiliary power unit would eliminate heavy bleed air ducting, reduce parasitic losses, and simplify transmission systems. It also may offer more attractive thermodynamic cycles. To date, however, no one has developed a truly engine integrated auxiliary power unit.

SUMMARY OF THE INVENTION

Accordingly, it is an object of the present invention to provide an engine integrated auxiliary power unit.

It is yet another object of the present invention to provide an engine integrated auxiliary power unit which provides weight and cost savings.

It is still another object of the present invention to provide an engine integrated auxiliary power unit which eliminates heavy bleed air ducting, reduces parasitic losses, and simplifies transmission systems.

The foregoing objects are attained by the engine integrated auxiliary power unit of the present invention.

In accordance with the present invention, an engine integrated auxiliary power unit for a jet engine having a low pressure spool and a high pressure spool has means for independently operating the high pressure spool and thereby utilizing the high pressure spool as an auxiliary power unit. The independent operating means comprises at least one inlet port for blocking conventional air flow through the engine and for providing air to the inlet of the high pressure compressor of the high pressure spool. The independent operating means further comprises at least one exit port for discharging air exiting from the high pressure turbine of the high pressure spool. In a two-spool engine, the inlet port(s) are located between the low pressure compressor and the high pressure compressor and the exit port(s) are located between the high pressure turbine and the low pressure turbine. In a three-spool engine, the inlet port(s) are located between the intermediate pressure compressor and the high pressure compressor and the exit port(s) are located between the high pressure turbine and the intermediate pressure turbine.

Other details of the engine integrated auxiliary power unit of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

The present invention involves the integration of an auxiliary power unit into an engine cycle, thus eliminating the need for a conventional auxiliary power unit. In principle, the high pressure system of a two- or three-spool engine can be operated independently from the rest of the engine—given that compressors and turbines are aerodynamically de-coupled.

Figure 1:
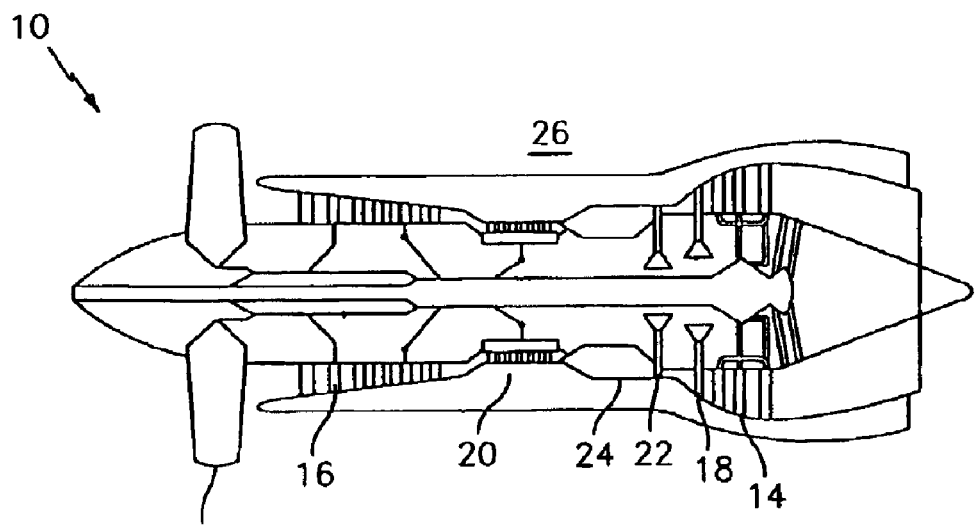
FIG. 1 is a schematic representation of a conventional three-spool turbine engine.
Figure 2:
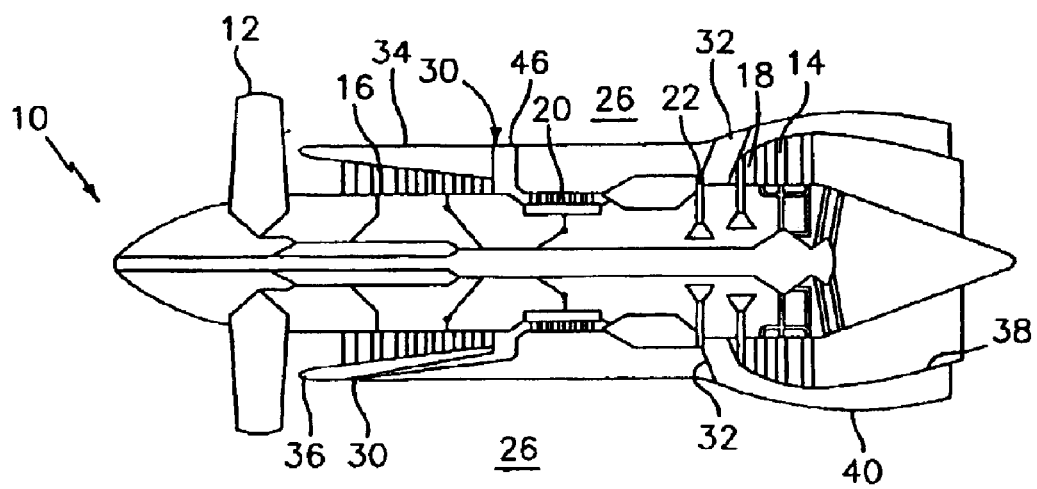
FIG. 2 is a schematic representation of a three-spool engine having an integrated auxiliary power unit.

Referring now to FIG. 2 of the drawings, a three-spool engine is illustrated. Integration of the auxiliary power unit into the engine cycle is achieved by providing one or more variable inlet ports 30 for allowing air to be introduced directly into an inlet of a high pressure compressor 20. The air introduced through the port(s) 30 is used to drive the high pressure compressor 20 and the high pressure turbine 22. Air which has been passed through the high pressure turbine 22 is ducted out of the engine via one or more exit ports 32. By flowing air through the high pressure compressor 20 and the high pressure turbine 22 alone in this manner, without having air flow through the low pressure compressor 12 and the low pressure turbine 14 and/or the intermediate pressure compressor 16 and the intermediate pressure turbine 18, one can use the high pressure spool of the engine as an auxiliary power unit.

In a three spool engine, the inlet port(s) 30 would introduce air between the intermediate pressure compressor 16 and the high pressure compressor 20 and the exit port(s) 32 would be located between the high pressure turbine 22 and the intermediate pressure turbine 18. In a two-spool engine, the inlet port(s) 30 are located between the low pressure compressor 12 and the high pressure compressor 20 and the exit port(s) 32 are located between the high pressure turbine and the lower pressure turbine.

In the engine arrangement of FIG. 2, the inlet port(s) 30 may be located in an engine nacelle 34 aft of the intermediate compressor 16. Alternatively, the inlet ports 30' may have an inlet located near a leading edge 36 of the nacelle 34 and a passageway 37 for ducting air to the region between the intermediate compressor 16 and the high pressure compressor 20.

The exit port(s) 32 may be located immediately aft of the exit of the high pressure turbine 22 so that the exhaust flow exits over a mid-portion of the nacelle 34. Alternatively, to reduce the heat load on the nacelle 34, the exit port(s) 32' may be arranged to duct the exhaust flow between the engine core 38 and an inner nacelle wall 40.

Figure 3:
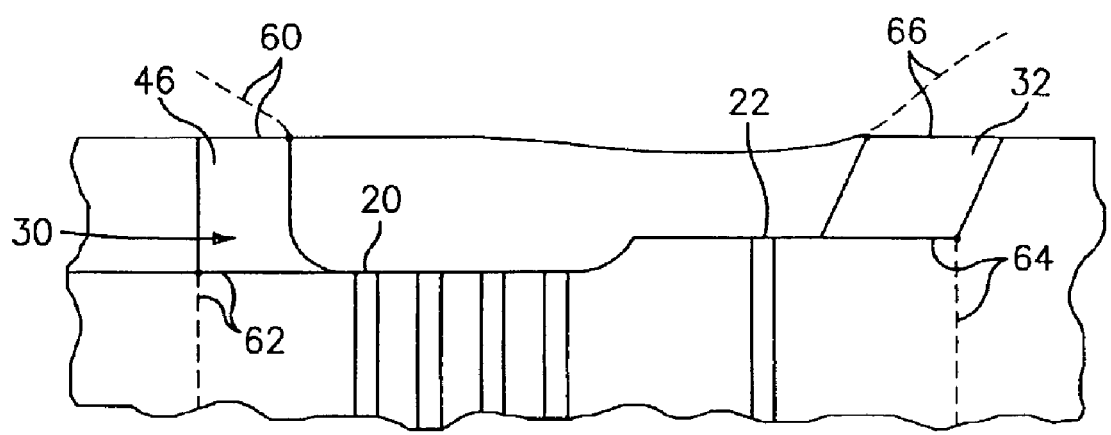
FIG. 3 is an enlarged view of a portion of the engine of FIG. 2.

As shown in FIG. 3, flaps 60, 62, 64, and 66 may be incorporated into the nacelle walls to open and close the inlet and exit ports 30 and 32 and to block flow in the conventional flow path. For example, the flap 60 in a closed position blocks the entry of air through a respective inlet port 30 and in an open position allows air to enter the inlet port 30. The flap 62, in an open position, allows air to enter the inlet of the high pressure compressor 20 and blocks the normal or standard air flow path through the engine and, in closed position, blocks air from exiting the port 30 into the inlet of the high pressure compressor 20 and allows the normal flow of air through the engine to the high pressure compressor 20. The flap 64, in an open position, blocks the normal air flow exit of the engine and opens the inlet of exit port 32. In a closed position, the flap 64 blocks the flow of air into the exit port 32 and allows normal air discharge through the engine. The flap 66, in an open position, allows air in the exit port 32 to be discharged through the nacelle 34 and, in a closed position, prevents air from being discharged through the exit port 32. Any suitable means known in the art may be used to operate the flaps 60, 62, 64, and 66.

As can be seen from the foregoing discussion, the inlet and exit ports 30 and 32 and the flaps 60, 62, 64, and 66 shut-off the conventional air flow path in the engine 10, which is used during standard main engine operation, and establish a connection to the by-pass duct 26. This connection can be in the form of a simple radial duct 46 or a duct of a more sophisticated design that aims at reduced inlet losses.

In operation, air ducted through the inlet port(s) 30 or 30' is used to drive the high pressure spool, and thus provide needed electrical power and/or shaft power, during engine startup or at other times. During standard engine operation, the inlet and exit ports are closed and the engine operates in a normal manner.

If desired, flaps 60 and 62 can be combined into one valve/flap arrangement. Similarly, flaps 64 and 66 can be combined into another single valve/flap arrangement.

The advantages of the present invention are significant weight and cost benefits in comparison with conventional main engine/APU architecture.

It is apparent that there has been provided in accordance with the present invention an engine integrated auxiliary power unit which fully satisfies the objects, means and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations.

What is claimed is:

1. An engine having an integrated auxiliary power unit comprising:
   a low pressure spool including a low pressure compressor and a low pressure turbine;
   a high pressure spool including a high pressure compressor and a high pressure turbine;
   means for independently operating said high pressure spool so that said high pressure spool functions as said auxiliary power unit;
   said operating means including at least one means for blocking air flow through said engine and for supplying said air to an inlet of said high pressure compressor;
   said engine including an intermediate pressure compressor, said at least one blocking and air supplying means comprising at least one inlet port for supplying air to an inlet of said high pressure compressor and said at least one inlet port being located between said intermediate pressure compressor and said high pressure compressor; and
   each said at least one inlet port comprising a first flap in an external wall of said nacelle, a second flap in an internal wall of said nacelle, and a duct extending between said first flap and said second flap.

2. An engine according to claim 1, wherein said first flap opens and closes an opening in said external wall of said nacelle.

3. An engine having an integrated auxiliary power unit comprising:
   a low pressure spool including a low pressure compressor and a low pressure turbine;
   a high pressure spool including a high pressure compressor and a high pressure turbine;
   means for independently operating said high pressure spool so that said high pressure spool functions as said auxiliary power unit;
   said operating means including at least one means for blocking air flow through said engine and for supplying air to an inlet of said high pressure compressor;
   said operating means further including at least one means for discharging air exiting from said high pressure turbine; and
   said at least one discharging means including at least one exit port located between said high pressure turbine and said low pressure turbine.

4. An engine according to claim 3, wherein said at least one discharging means further includes at least one flap for blocking an engine exit flow path and for opening said at least one exit port.

5. An engine having an integrated auxiliary power unit comprising:
   a low pressure spool including a low pressure compressor and a low pressure turbine;
   a high pressure spool including a high pressure compressor and a high pressure turbine;
   means for independently operating said high pressure spool so that said high pressure spool functions as said auxiliary power unit;
   said operating means including at least one means for blocking air flow through said engine and for supplying air to an inlet of said high pressure compressor;
   said operating means further including at least one means for discharging air exiting from said high pressure turbine; and said engine having an intermediate pressure turbine and wherein said at least one discharging means includes at least one exit port positioned between said high pressure turbine and said intermediate pressure turbine.

6. An engine according to claim 5, wherein said at least one discharging means further includes at least one flap for blocking an engine exit flow path and for opening said at least one exit port.

7. An engine having an integrated auxiliary power unit comprising:

an engine nacelle;

a low pressure spool including a low pressure compressor and a low pressure turbine located within said engine nacelle;

a high pressure spool including a high pressure compressor and a high pressure turbine located within said engine nacelle;

means for independently operating said high pressure spool so that said high pressure spool functions as said auxiliary power unit;

said independent operating means including an air inlet port located in said engine nacelle between said low pressure compressor and said high pressure compressor for supplying air to an inlet of said high pressure compressor; and each said at least one inlet port comprising a first flap in an external wall of said nacelle, a second flap in an internal wall of said nacelle, and a duct extending between said first flap and said second flap.

8. An engine according to claim 7, wherein said second flap comprises means for blocking air flow through said engine and for supplying air to said inlet of said high pressure compressor.

9. An engine according to claim 8, wherein said operating means includes at least one means for discharging air exiting from said high pressure turbine.

10. An engine according to claim 7, wherein said first flap opens and closes an opening in said external wall of said nacelle.

* * * * *